(12) United States Patent
Ayala et al.

(10) Patent No.: US 12,456,468 B1
(45) Date of Patent: Oct. 28, 2025

(54) AUTHENTICATED USER VOICE SIGNATURES USING VALIDATED INPUT

(71) Applicant: UIPCO, LLC, San Antonio, TX (US)

(72) Inventors: Jennifer Dawn Ayala, San Antonia, TX (US); Zachery C. Lake, Fort Wayne, IN (US); Sydney Ann Conrad-Cook, Van Meter, IA (US); Courtney St. Martin, Forney, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 341 days.

(21) Appl. No.: 17/851,598

(22) Filed: Jun. 28, 2022

(51) Int. Cl.
*G10L 17/04* (2013.01)
*G10L 17/02* (2013.01)
*G10L 17/06* (2013.01)
*G10L 17/24* (2013.01)

(52) U.S. Cl.
CPC .............. *G10L 17/04* (2013.01); *G10L 17/02* (2013.01); *G10L 17/06* (2013.01); *G10L 17/24* (2013.01)

(58) Field of Classification Search
None
See application file for complete search history.

(56) References Cited

U.S. PATENT DOCUMENTS

| | | | | |
|---|---|---|---|---|
| 10,747,858 B2 * | 8/2020 | Votaw | .................... | H04L 63/101 |
| 11,792,611 B2 * | 10/2023 | Jaquish | ................. | H04L 51/214 |
| | | | | 715/753 |
| 12,003,507 B2 * | 6/2024 | Chaudhry | ........... | H04L 63/0861 |
| 2020/0258176 A1 * | 8/2020 | Gibson | .................... | G06F 21/32 |
| 2023/0206231 A1 * | 6/2023 | Saad | .................. | G06Q 20/4016 |
| | | | | 705/75 |

* cited by examiner

*Primary Examiner* — Pierre Louis Desir
*Assistant Examiner* — Kristen Michelle Masters
(74) *Attorney, Agent, or Firm* — Potomac Law Group, PLLC; Dannon G. Allbee

(57) ABSTRACT

Aspects of the present disclosure are directed to generating voice signatures using validated input from an authenticated user. The voice signature can represent a user's endorsement in relation to one or more electronic document(s). For example, the user can view the electronic document(s) at a client device and provide audio input in relation to the one or more document(s). Implementations of a signature manager can receive the user's audio input, authenticate the user identity, validate the input against one or more validation rules, and generate a voice signature in relation to the electronic document(s). The generated voice signature can then be stored in combination with the electronic document(s), for example in a manner that satisfies an authenticity audit of the electronic document(s).

20 Claims, 7 Drawing Sheets

AUTHENTICATED USER VOICE SIGNATURES USING VALIDATED INPUT

TECHNICAL FIELD

The present disclosure is directed to authentication and validation in documents by generating voice signatures using validated input from an authenticated user.

BACKGROUND

Multi-party interactions are dependent on efficient and effective coordination. In addition, as in-person interactions move to online settings, technologies that support online coordination among these parties have grown in importance. For example, an online setting can raise authenticity questions with regard to party identity and/or party intention, such as in the signing of documents. Technologies that enhance trust in party authentication and support verifiable representations of party intention in online settings can improve interactions among multiple parties.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
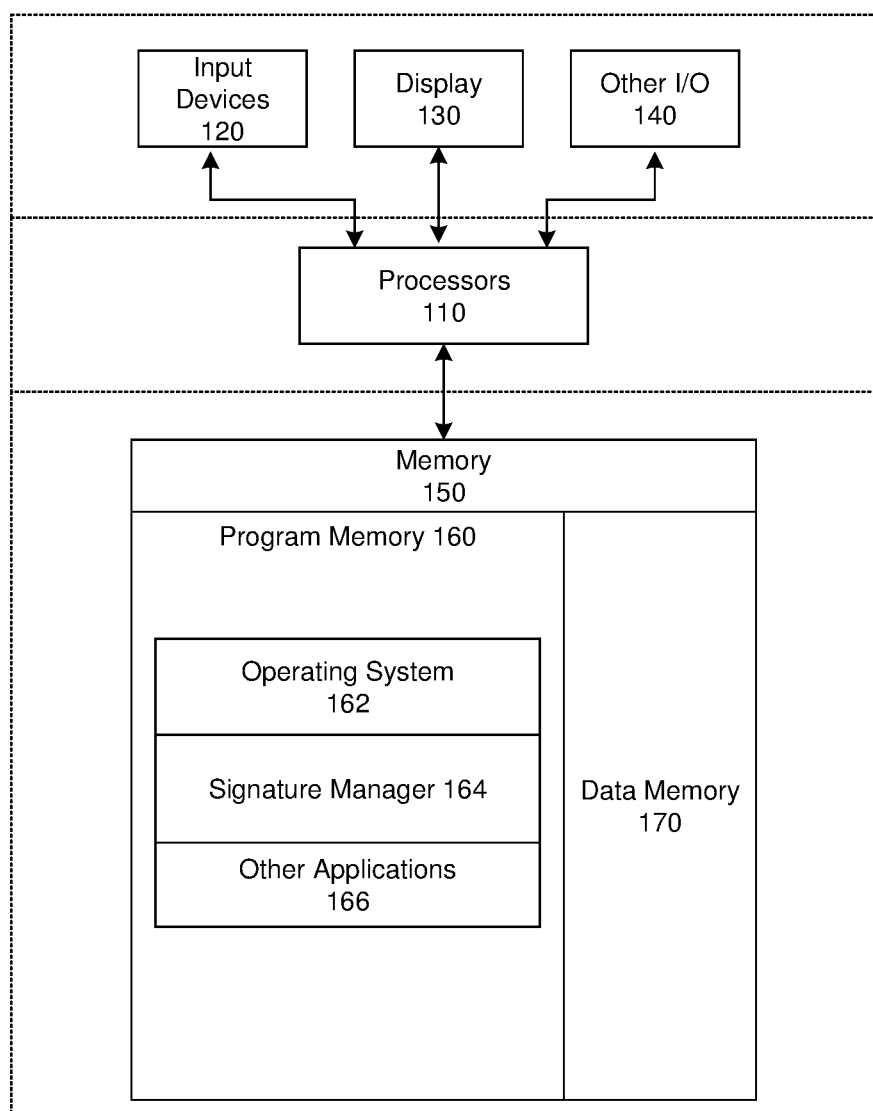
FIG. 1 is a block diagram illustrating an overview of devices on which some implementations can operate.

Aspects of the present disclosure are directed to generating a voice signature using validated input from an authenticated user. The voice signature can represent a user's endorsement (e.g., user signing off) in relation to one or more electronic document(s). For example, the user can view the electronic document(s) at a client device and provide audio input in relation to the one or more document(s). Implementations of a signature manager can receive the user's audio input, validate the input against one or more validation rules, and generate a voice signature (using the audio input) in relation to the electronic document(s).

In some implementations, the electronic document(s) can be provided to the user at the client device via a user interface, such as via a webpage, secure online portal (e.g., secured with a username and password), email, or in any other suitable manner. After review of the electronic document(s) that user may intend to sign the documents, for example so that the user can enter into an agreement, initiate a service, or trigger any other action related to the signing of an electronic document. Implementations of the signature manager receive the audio input comprising the user's endorsement/verbal signature of the electronic document(s) and validate the audio input. For example, the signature manager's validation can include validating that the audio input comprises audio from the user (e.g., the user's voice), and that the audio from the user communicates an intention to sign the contract.

In some implementations, the signature manager can authenticate an identity for the user using the audio input. For example, voice reference sample(s) can be stored in relation to one or more identities (e.g., user identities managed at a system), and the signature manager can compare the audio within the audio input (e.g., the voice) to the voice reference sample(s). For example, the electronic document(s) can be provided to a specific user identity, and the audio input can be compared to voice reference sample(s) stored for the specific user identity to authenticate that the audio within the input (e.g., the voice) is from the specific user identity. In some implementations, one or more machine learning models trained/configured to match reference voice(s) to input audio can be used to authenticate that the input audio is from the specific user identity.

In some implementations, the voice reference sample(s) stored for a particular user identity can be an embedding generated by a machine learning model. For example, the machine learning model can receive several pieces of audio from the particular user identity (e.g., voice samples) and generate an embedding that represents the user's voice. The signature manager can then authenticate that a received piece of audio input includes audio from the particular user identity by providing a prediction model (e.g., machine learning model) the sample input and the embedding for the particular user identity. The prediction model can be configured to predict a likelihood that the received piece of audio input includes the voice of the particular user identity. When the prediction is above a threshold value, the signature manager can authenticate that the received piece of audio input includes audio from the particular user.

In some implementations, the signature manager validates the received audio input against validation rules. Example validation rules can validate that conditions for the audio input are suitable for the generation of a voice signature, such as quality rules (e.g., audio quality meets a criteria), clarity rules (e.g., voice clarity criteria, audio statement clarity criteria, etc.), size rules, and other suitable validation rules. In some implementations, one or more transcription models (e.g., machine learning model or other suitable transcription model) can be configured to extract natural language text from the audio input. In this example, at least one transcription model can be configured to output a confidence value for the transcribed text. The quality rules and/or clarity rules can comprise a criteria defined relative to the output confidence value. For example, when the transcription model can output a text transcript with a confidence above a threshold value, the quality and/or clarity of the audio input can be validated. Any other suitable technique to validate quality and/or clarity can be implemented.

In some implementations, one or more validation rules can be defined according to the provided electronic document(s). For example, the provided electronic document(s) can include one or more identifiers (e.g., unique code numbers), and a validation rule can be defined that validates the audio input includes the user identity's voice speaking the one or more identifiers. In another example, a provided electronic document can include predetermined sub-sections, and a validation rule can be defined that validates the audio input includes the user identity's voice acknowledging the predetermined sub-sections of the document. In some implementations, one or more validation rules can be defined according to the user identity. For example, the user identity can be associated with a predetermined code word, and at least one validation rule can be defined to validate that the audio input includes the user identity's voice speaking the codeword.

In some implementations, after identity authentication and audio input validation, the signature manager can generate the voice signature and store the voice signature in combination with the one or more documents. For example, the voice signature can be stored as an audio file and the one more documents can be stored as data file(s), and these stored items can be linked (e.g., a link in the one or more documents can point to the storage location of the audio file). In another example, the voice signature can be compressed and embedded into the one or more documents. For example, the voice signature can be embedded as a series of QR codes that represent the audio data. In another example, the one or more documents and voice signature can be added to an archive (e.g., compression archives, such as a zip archive) that is stored. In some implementations, these example storage items can be stored at a cloud storage device.

In some implementations, the signature generator can store the electronic document(s) and voice signature at a blockchain ledger. For example, the electronic documents and voice signature can be included as a block in the blockchain ledger. In this example, multiple parties can manage the blockchain ledger, and thus the authenticity of the data stored at the blockchain ledger can be maintained. In some implementations the user identity and entity that provides the one or more electronic documents may have an ongoing relationship with multiple signed electronic documents. In this example, other combinations of electronic document(s) and corresponding voice signature(s) can be stored at the blockchain ledger such that the ledger can be a transparent representation of the historic relationship between the user identity and the providing entity.

Implementations improve on several conventional drawbacks for securing a user's endorsement on an electronic document. For example, a conventional electronic document endorsement is a signature, often a computer-generated signature rather than the user's physical signature. This can result in uncertainty in whether the signature is from an indicated person and whether the signature truly represents that user's agreement to the terms in the document (e.g., whether they actually read the document). In addition, the storage policies for these signed electronic documents can be opaque, and thus the user and/or counterparty may lose trust in the agreement represented by the electronic document.

Implementations store the user's own voice ratifying/endorsing the electronic document as a voice signature. As the user's own voice is recorded and stored, the endorsement can feel personal to the user and the user can be satisfied that the agreement was indeed endorsed. In addition, the authentication of the user's voice and the validation of the input audio generates a reliable endorsement flow so that the user and counterparty can trust the endorsement—both in terms of authenticating the signer and confirming that the signature shows agreement to terms through verifications of those terms. Implementations also store the voice signature and electronic document(s) in combination. For example, various implementations include storage of the voice signature in a physical document—e.g., as printed QR codes or the voice signature and electronic document(s) can be linked at a blockchain so that the user and counterparty (or any third-party) can rely on the integrity of the stored data.

Several implementations are discussed below in more detail in reference to the figures. FIG. 1 is a block diagram illustrating an overview of devices on which some implementations of the disclosed technology can operate. The devices can comprise hardware components of a device 100 that generate a voice signature using validated input from an authenticated user. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, signature manager 164, and other application programs 166. Memory 150 can also include data memory 170, e.g., audio reference data, identity data, document data, validation data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
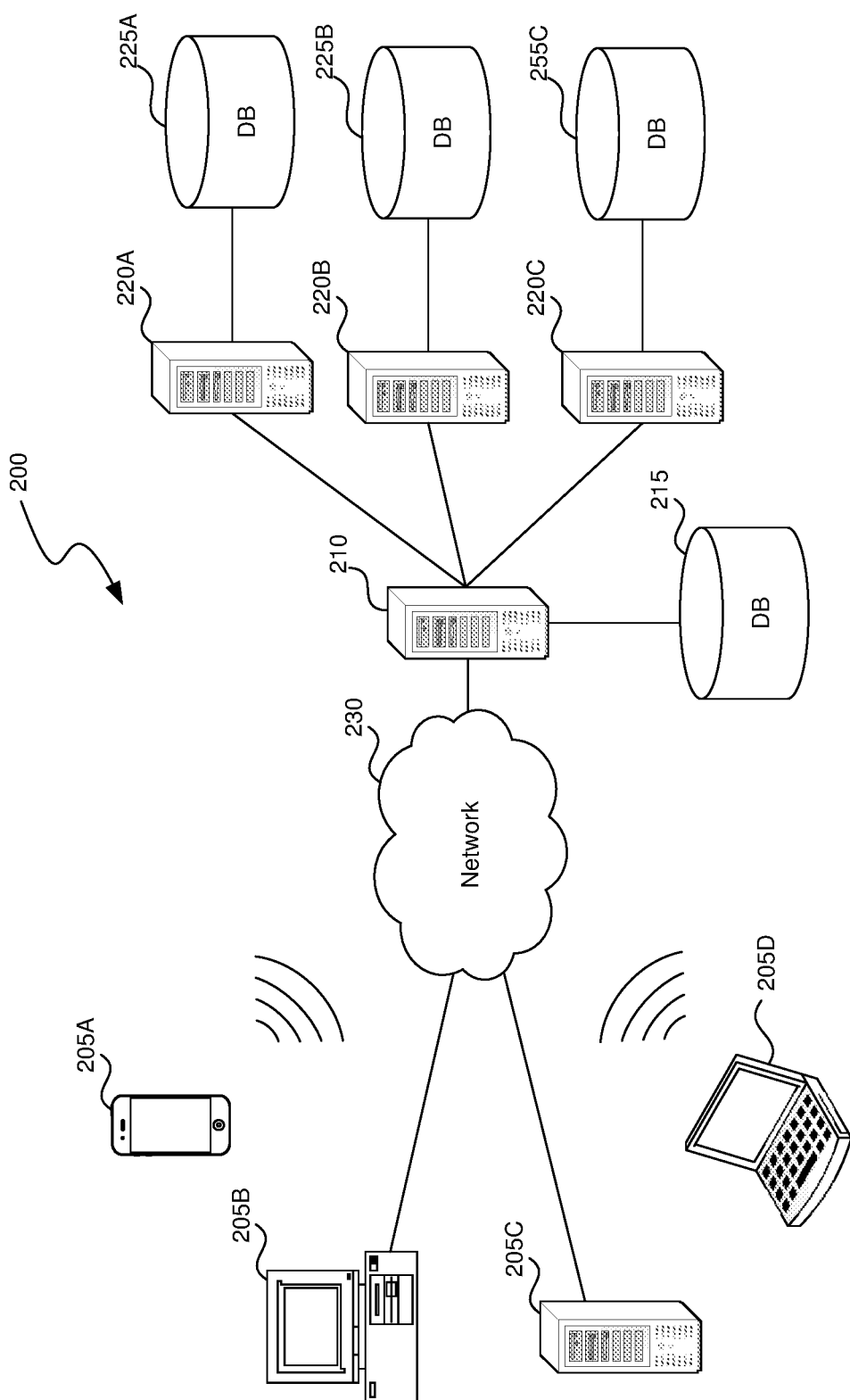
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as identity data, document data, validation data, and other suitable data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
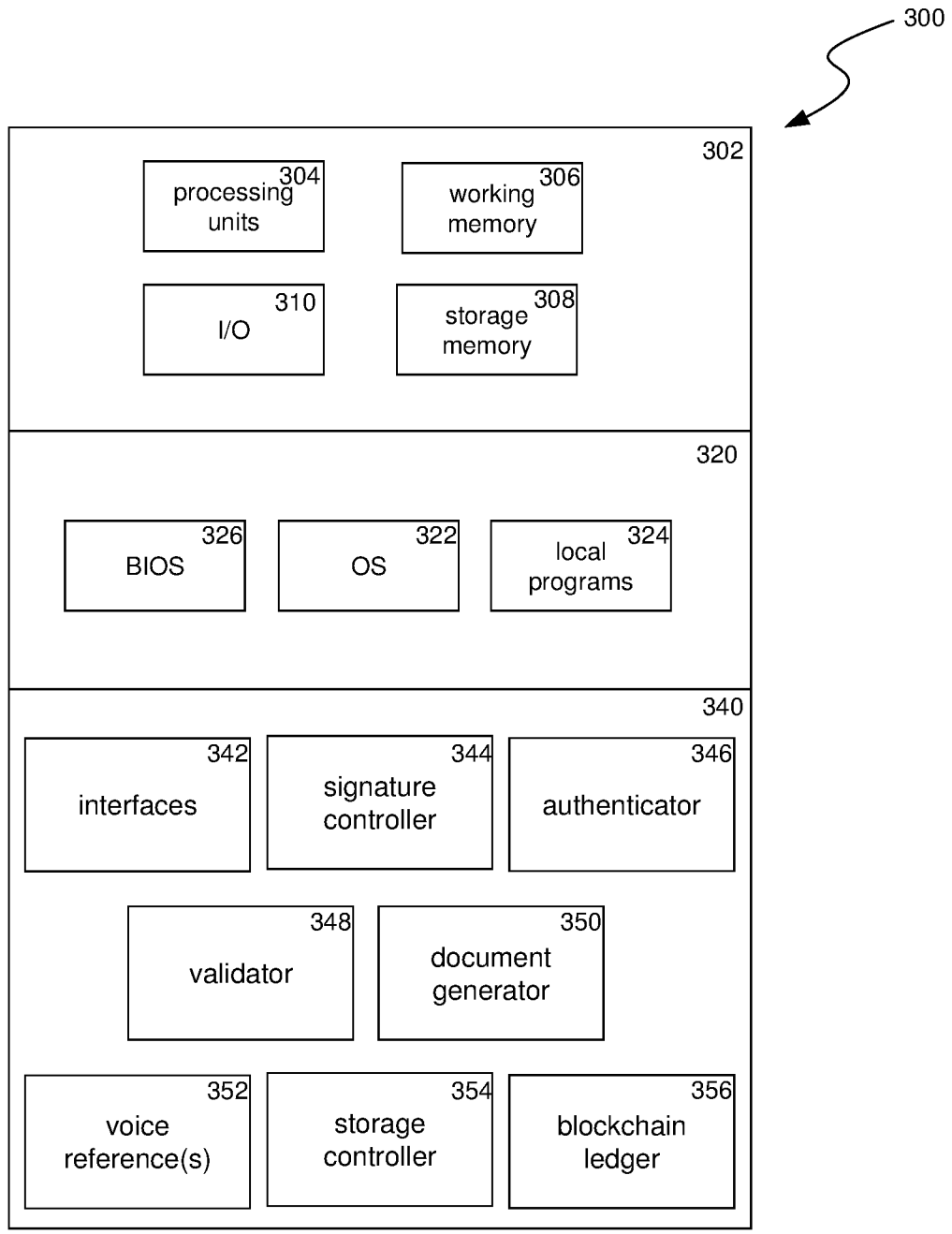
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include signature controller 344, authenticator 346, validator 348, document generator 350, voice signature reference(s) 352, storage controller 354, blockchain ledger 356, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Signature controller 344 can generate the voice signature that is stored in combination with one or more electronic document(s), for example after user identity authentication and audio input validation. Signature generator can receive audio input from a user and provide the audio input to authenticator 346 and validator 348. Authenticator 346 can authenticate the user's identity using the audio input. Validator 348 can validate the audio input against one or more validation rules.

In some implementations, signature controller 344 can, after the user is authenticated and the audio input is validated, generate a voice signature using the audio input. For example, the voice signature can be an audio file, a data representation of the audio (e.g., series of QR codes), or any other suitable voice signature. In some implementations, the voice signature can be an archive (e.g., zip archive) that includes both the voice signature (e.g., audio file) and the one or more electronic document(s) that that the voice signature signs. Once the voice signature is generated, signature controller 344 can provide the voice signature to storage controller 354 for storage. Additional details on signature controller 344 are provided below in relation to system 400 of FIG. 4 and blocks 704 and 708 of FIG. 7.

Authenticator 346 authenticates an identity for the user that provides the audio input. For example, electronic document(s) generated by document generator 350 can be provided to a user. The user can view the electronic document(s) and provide audio input that pertains to the provided electronic document(s). For example, the audio input can include the user's voice and speech that endorses or "verbally signs" the electronic documents. Authenticator 346 can authenticate that the voice within the audio input belongs to a known user identity.

For example, an identity management system can store user identities accessible by authenticator 346. In some implementations, the user identities can correspond to customers, clients, members, or other suitable known users, and the stored identities can be verified/vetted, such as according to policies at a banking institution, credit union, other suitable financial institution, school or university, medical organization, or any other suitable policies. In some implementation, voice reference(s) 352 can be stored for one or more of the user identities. For example, voice reference(s) 352 can be stored audio of the user identity's voice speaking a variety of words, phrases, sentences, numbers, and the like. In some implementations, voice reference(s) 352 can be an embedding generated by a voice model, such as a machine learning model. For example, a component of the voice model can be trained/configured to receive audio data as input and project characteristics of the voice included in the audio data into an embedding, or a data representation of the voice.

Authenticator 346 can authenticate the identity of the user voice in the received audio input using voice reference(s) 352. For example, the user voice in the received audio can be compared to one or more voice reference(s) 352 to identify a matching user identity. In some implementations, the specific user identity of the user that is provided the electronic document(s) is known, and authenticator 346 can authenticate that the voice in the audio input belongs to the specific user identity using voice reference(s) 352 for the specific user identity. For example, a machine learning model trained/configured to compare voice data in separate audio files and predict a likelihood of a match can be used to authenticate the user identity using the voice reference(s) 352. When the output prediction meets or exceeds a threshold value, a match can be detected and authenticator 346 can authenticate the user identity.

In some embodiments, a component of a voice model (e.g., machine learning model) can be used to generate an embedding of the audio input, and the embedding of the audio input can be compared against embedding versions of voice reference(s) 352. For example, a machine learning model trained/configured to compare voice data embeddings and predict a likelihood of a match can be used to authenticate the user identity using the embedding version of the audio input and the embedding version(s) of voice reference(s) 352. When the output prediction meets or exceeds a threshold value, a match can be detected and authenticator 346 can authenticate the user identity.

In some implementations, authenticator 346 can authenticate that the user identity is speaking for the duration of the audio input. For example, once a match is detected between a user identity and the voice in an audio input, the voice reference(s) 352 specific to the determined user identity can be used to detect that each utterance (or each phrase or group of utterances) in the audio input matches the voice reference(s) 352 specific to the determined user identity. When it is determined that the duration of the audio matches the voice reference(s) specific to the determined user identity, a match can be detected and authenticator 346 can authenticate the user identity. Additional details on authenticator 346 are provided below in relation to system 400 of FIG. 4 and block 706 of FIG. 7.

Validator 348 can validate the audio input against one or more validation rules. In order for the audio input to serve as a source for the voice signature, the audio input may need to meet certain criteria, such as include a voice statement from the authenticated user identity that indicates the user intends to endorse or sign the electronic document(s), meet clarity criteria, meet quality criteria, or meet other suitable validation criteria. Validator 348 can validate that the audio input meets the validation criteria to serve as a source for a voice signature.

One or more transcription models (e.g., machine learning model or other suitable transcription model) can be configured to extract natural language text from the audio input. In some implementations, at least one transcription model can be configured to output a confidence value for the transcribed text. For example, audio of a low quality and/or a soft voice in the audio input may be a source for transcription errors. The quality criteria and/or clarity criteria can comprise a criteria defined relative to the output confidence value. For example, when the transcription model outputs a text transcript with a confidence above a threshold value, the quality and/or clarity of the audio input can be validated. Any other suitable technique to transcribe the audio input and/or validate quality/clarity can be implemented.

In some implementations, one or more validation rules can be defined according to the provided electronic document(s). For example, the provided electronic document(s) can include one or more identifiers (e.g., unique code numbers), and a validation rule can be defined that validates the audio input includes the user identity's voice speaking the one or more identifiers. A unique code can be associated with a version of the electronic document that the user intends to sign. For example, the document may have several variations, and the unique code can identify a particular document.

In another example, a provided electronic document can include predetermined sub-sections, and a validation rule can be defined that validates the audio input includes the user identity's voice acknowledging the predetermined sub-sections of the document. For example, it may be beneficial to record a user's voice identifying the individual portions of the document the user intends to agree to/electronically sign. In some circumstances, policy or other relevant rules may require a user to acknowledge certain portions of a document in order for the electronic document endorsement/signature to be effective. A validation rule that validates a user's acknowledgement of these portions an ensure compliance with such policy/rules.

In some implementations, one or more validation rules can be defined according to the user identity. For example, the user identity can be associated with a predetermined code word, and at least one validation rule can be defined to validate that the audio input includes the user identity's voice speaking the codeword. The user can be associated with other items such as a code phrase or an image, and a validation rule can be defined to validate that the audio input includes the user identity's voice speaking the code phrase and/or describing the image (e.g., a basketball, a bridge, a taxicab, etc.). Additional details on validator 348 are provided below in relation to system 400 of FIG. 4 and block 708 of FIG. 7.

Document generator 350 can generate one or more of the electronic document(s) provided to the user. For example, the document generator can receive the electronic document(s) that the user intends to sign with the voice signature and augment the electronic document(s) with one or more elements relevant to the user identity and/or voice signature. These augments can include embedding a unique identifier for the electronic document(s) (or several unique identifiers), embedding a codeword, code phrase, or image unique to the user identity, or embedding any other suitable element that the user interacts with to generate the audio input that sources the voice signature. In some implementations, document generator 350 can receive the electronic document(s) from a third-party entity, a document management system, or any other suitable source for electronic document(s).

Storage controller 354 can manage the storage of the combined voice signature and electronic document(s). For example, the electronic document(s) can be augmented to include a link to the storage location of the generated voice signature. In another example, code segments (e.g., QR code blocks) that store a data representation of the generated voice signature can be embedded into the electronic document(s). In another example, the electronic document(s) and the generated voice signature can be added to an archive that is stored. Implementations of storage controller 354 can store these example combinations at a cloud server. Additional details on storage controller 354 are provided below in relation to system 400 of FIG. 4 and block 714 of FIG. 7.

In some implementations, storage controller 354 uses blockchain ledger 356 to store the voice signature, the electronic document(s), or a combination of these. For example, blockchain ledger 356 can store the voice signature and/or electronic document(s), or manage the integrity of the stored voice signature/electronic document(s). For example, a block in blockchain ledger 356 can include a data file that stores the voice signature and/or a data file that stores the electronic document(s). In some examples, because the combination is stored in a blockchain, neither the electronic document(s) nor the voice signature can be modified without consensus from the parties that manage blockchain ledger 356. In some implementations, a block of the blockchain ledger 356 can include portions of the voice signature and/or the electronic document(s). Additional details on blockchain ledger 356 are provided below in relation to system 400 of FIG. 4, diagram 500 of FIG. 5, and block 714 of FIG. 7.

Figure 4:
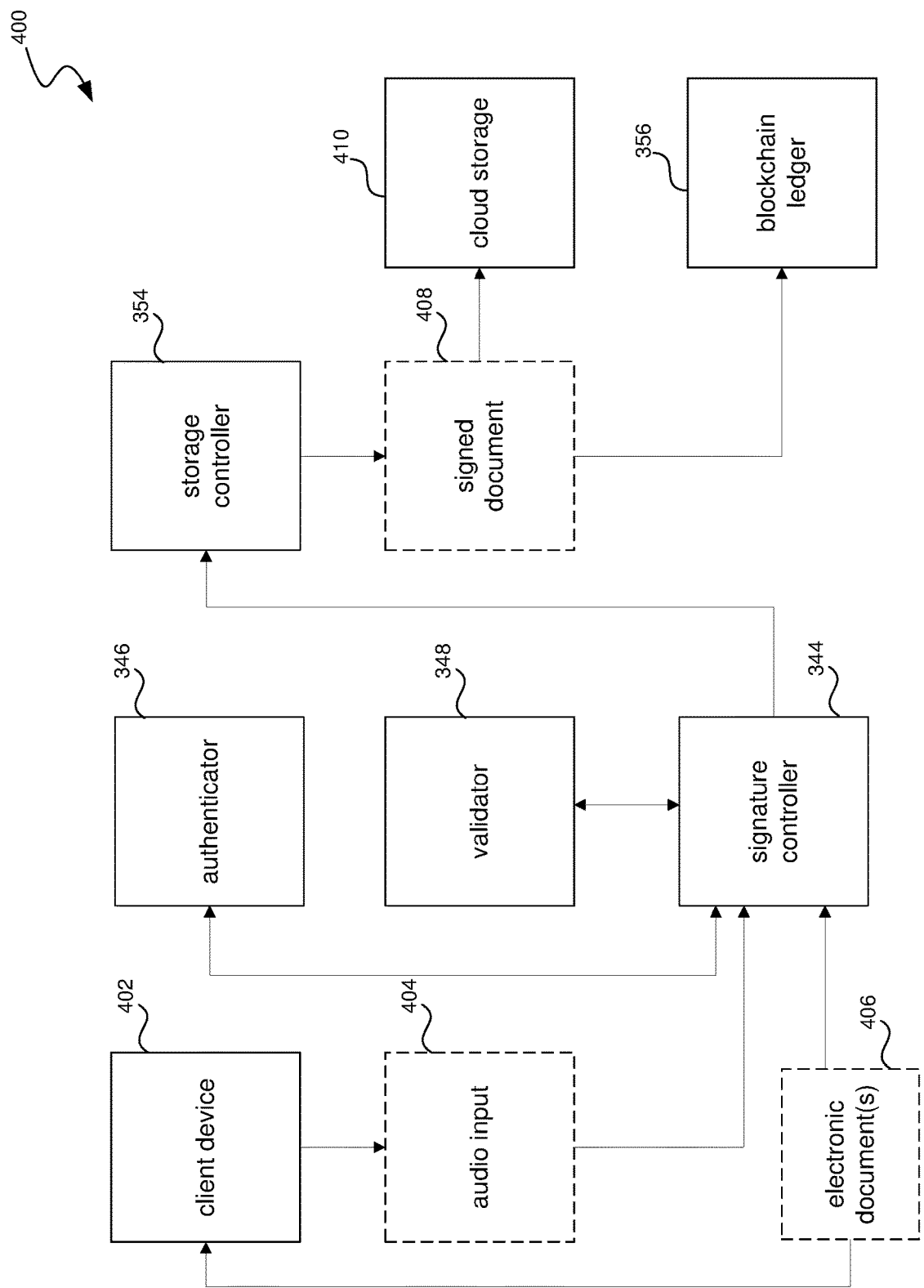
FIG. 4 is a system diagram illustrating components used in some implementations for generating a voice signature using validated input from an authenticated user.

FIG. 4 is a system diagram illustrating components used in some implementations for generating a voice signature using validated input from an authenticated user. System 400 includes client device 402, audio input 404, electronic document(s) 406, signature controller 344, authenticator 346, validator 348, storage controller 354, signed document 408, cloud storage 410, and blockchain ledger 356.

Client device 402 can be any device suitable for use by a user or member, such as a smartphone, laptop, tablet, or any other suitable client device. For example, client device 402 can receive electronic document(s) 406. The electronic document(s) 406 can include a contract or any other suitable documents that contain language for review by a user to enter into an agreement. Electronic document(s) 406 can be transmitted to client device 402 by any suitable document server (e.g., document generator 350 of FIG. 3) and/or by a third-party that would like to enter into an agreement with the user.

In some implementations, the user can review the electronic document(s) 406 at client device 402 (or in any other suitable manner) and provide audio input 404 that includes acceptance or endorsement of the electronic document(s) 404. Example user utterances that can accept or endorse electronic document(s) 406 include: "I accept the terms of the contract titled [TITLE] presented to me, [NAME OF USER], by [COUNTERPARTY NAME], on [DATE]"; "I accept the terms of the agreement with identifier [IDENTIFIER] presented to me, [NAME OF USER], by [COUNTERPARTY NAME], on [DATE]"; "I accept the terms of the agreement with identifier [IDENTIFIER] presented to me, [NAME OF USER], by [COUNTERPARTY NAME], on [DATE]. I have reviewed [SUB-SECTION HEADING] and [SUB-SECTION HEADING] and agree to their terms"; "I accept the terms of the agreement with identifier [IDENTIFIER] presented to me, [NAME OF USER], by [COUNTERPARTY NAME], on [DATE]. I have reviewed [SUB-SECTION HEADING] and [SUB-SECTION HEADING] and agree to [TERMS]"; "I accept the terms of the agreement with identifier [IDENTIFIER] presented to me, [NAME OF USER], by [COUNTERPARTY NAME], on [DATE] at [TIME OF DAY]"; "I accept the terms of the agreement with identifier [IDENTIFIER] presented to me, [NAME OF USER], by [COUNTERPARTY NAME], on [DATE]. My codeword is [CODEWORD]"; or any combination thereof.

The audio input 404 can be received at signature controller 344 of FIG. 3. In some implementations, audio input 404 is received along with electronic document(s) 406. For example, client device 402 can transmit both audio input 404 and electronic document(s) 406, or electronic document(s) 406 can be received/retrieved from a separate data store (e.g., third-party data store, or any other suitable data store). Signature controller 344 can communicate with authenticator 346 and validator 348 to authenticate the user identity and validate audio input 404.

In some implementations, authenticator 346 can authenticate that the voice within audio input 404 corresponds to a known user identity. For example, electronic document(s) 406 can be generated for a specific user identity, and authenticator 346 can authenticate that the voice within audio input 404 is the voice of the specific user identity. In some implementations, authenticator 346 can authenticate the user identity using stored voice reference(s) or an embedding associated with the user identity's voice.

In some implementations, validator 348 can validate audio input 404 against validation rules. For example, one or more validation rules can be defined according to electronic document(s) 406. For example, electronic document(s) 406 can include one or more identifiers (e.g., unique code numbers), and a validation rule can be defined that validates the audio input includes the user identity's voice speaking the one or more identifiers. In another example, electronic document(s) 406 can include predetermined sub-sections, and a validation rule can be defined that validates the audio input includes the user identity's voice acknowledging or reading all or portions of the predetermined sub-sections. In another example, one or more validation rules can be defined according to the user identity. For example, the user identity can be associated with a predetermined code word, and at least one validation rule can be defined to validate that the audio input includes the user identity's voice speaking the codeword. The user can be associated with other items such as a code phrase or an image, and a validation rule can be defined to validate that the audio input includes the user identity's voice speaking the code phrase and/or describing the image.

Once the user's identity is authenticated by authenticator 346 and audio input 404 is validated by validator 348, signature controller 344 can generate the voice signature and provide the voice signature to storage controller 354. Signature controller 344 generates the voice signature using the source audio from the audio input 304. For example, the generated voice signature can be an audio file (e.g., mpeg, mp3, etc.), compressed file, or any other suitable voice signature. In some implementations, the voice signature can be an audio file uploaded by the user (after validation and authentication).

Once created, the voice signature can be provided to storage controller 354 along with electronic document(s)

406. Storage controller 354 can store the voice signature in combination with electronic document(s) 406 as signed document(s) 408, for example in cloud storage 410 and/or at blockchain ledger 356. For example, electronic document(s) 406 can be augmented to include a link to the storage location of the generated voice signature. In another example, code segments (e.g., QR code blocks, barcodes, numeric data blocks—e.g., binary or hex blocks, etc.) that are a representation of the generated voice signature can be embedded into electronic document(s) 406. In another example, electronic document(s) 406 and the generated voice signature can be added to a compression archive that is stored. Implementations of storage controller 354 can store these example combinations as signed document 408 at cloud storage 410.

Figure 5:
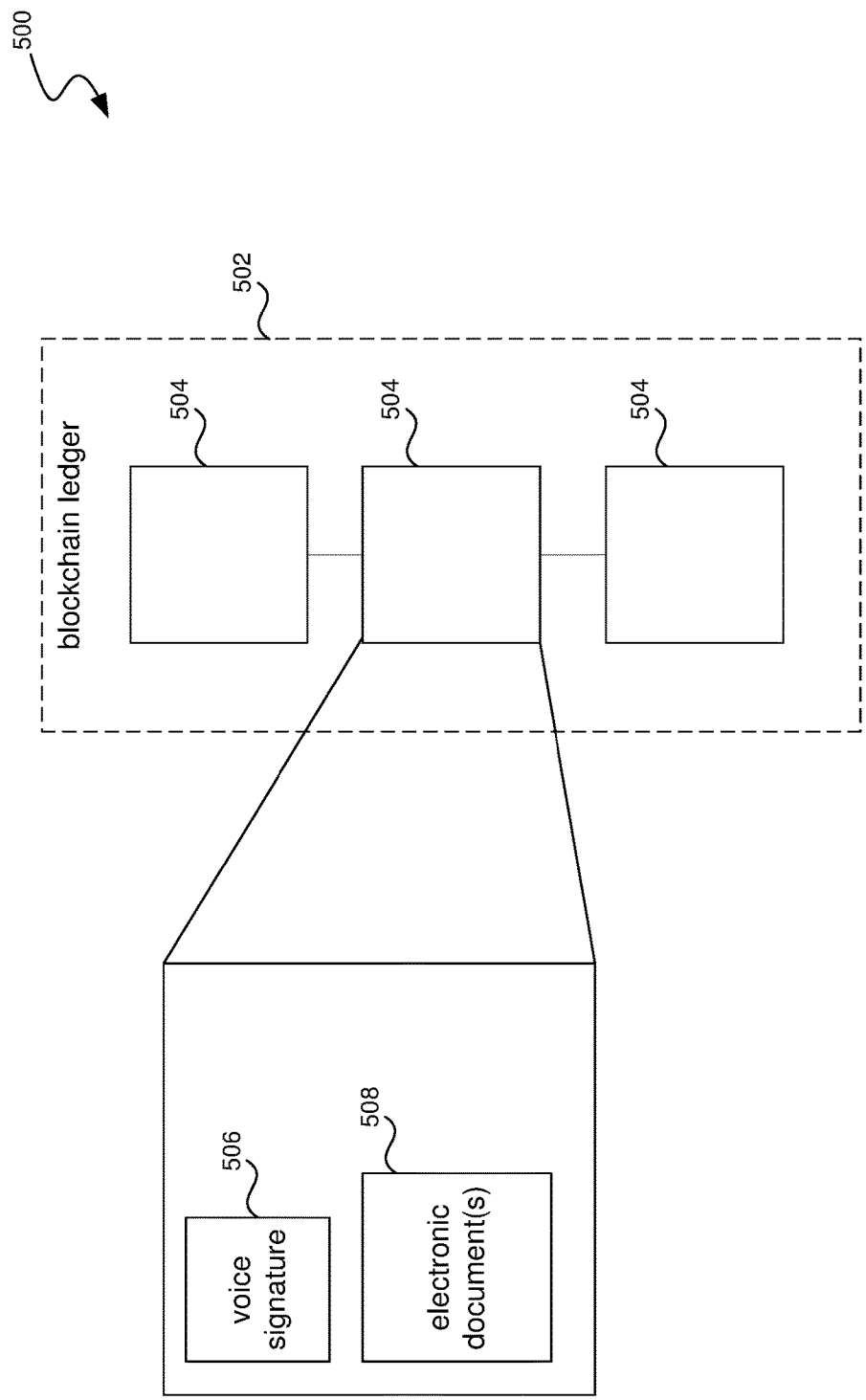
FIG. 5 is a conceptual diagram of a blockchain used in some implementations.

In some implementations, signed document 408 (or portions of the voice signature and/or electronic document(s) 406) can be stored at blockchain ledger 356. FIG. 5 is a conceptual diagram of a blockchain used in some implementations. Diagram 500 includes blockchain ledger 502, blocks 504, voice signature 506 and electronic document(s) 508. A blockchain is a list of records, each called a block, which can be linked through cryptography. Each block can include a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains can be difficult to modify because data, once added to the blockchain, cannot be altered without altering the subsequent blocks.

Implementations of blockchain ledger 502 can store voice signature 506 and/or electronic document(s) 508 that the voice signature endorses. For example, a block 504 of blockchain ledger 502 can store these elements. In some implementations the user identity and counterparty (e.g., entity that provides the one or more electronic documents) may have an ongoing relationship with multiple signed electronic documents. In this example, other combinations of electronic document(s) and corresponding voice signature(s) can be stored at blocks 504 of blockchain ledger 502 such that the ledger can be a transparent representation of the historic relationship between the user identity and the counterparty.

In some implementations, a first block 504 can store one of voice signature 506 or electronic document(s) 508 and a second block 504 can store one of voice signature 506 or electronic document(s) 508, thus generating multiple blocks 504 in blockchain ledger 502. Splitting voice signature 506 and electronic document(s) 508 can create an immutable chain of blocks 504 from a single pair of electronic document(s) 508 and voice signature 506.

Implementations of blockchain ledger 502 are managed by a blockchain community. The blockchain community can include the parties relevant to the electronic document(s) (e.g., the user identity and the counterparty). In some implementations, the voice signature service can be a separate service provided by an organization that is different from the user identity and the counterparty, and the organization can be a member of the blockchain community. In this example, because an entity that is separate from the contracting/agreeing parties is included in the blockchain community, the integrity of the stored voice signature 506 and electronic document(s) 508 can be enhanced.

In some implementations, blockchain ledger 502 can only be modified upon reaching a consensus from the blockchain community. Therefore, when stored at a blockchain the integrity of electronic document(s) 508 and voice signature 506 can be maintained. Because electronic document(s) 508 may define an agreement between parties and voice signature 506 may indicate the user identity's endorsement of the agreement, maintaining these elements in a manner that preserves integrity can permit either party to the agreement (or a third-party) to audit the documentation. Absent a mechanism that maintains electronic document(s) 508 and voice signature 506 with integrity, the parties to the agreement may doubt the agreement's definition and/or the agreement may be difficult to enforce.

In some implementations, the data processing and cryptographic functions leveraged by blockchain ledger 502 can include public key, private key, and digital signature cryptographic techniques, hash functions and cryptographic hash functions (e.g., secure hash algorithm ("SHA"), SHA-0, SHA-1, SHA-2, and the like), and any other suitable data processing or cryptographic functions used to secure the ledger while also maintaining feasible computational (e.g., "proof of work") scenarios. In some implementations, consensus of blockchain ledger 502 can be achieved using one or more of Practical Byzantine Fault Tolerance ("PBFT") algorithms, Proof of Authority ("PoA"), Proof of Elapsed Time ("PoET") algorithms, or any other suitable algorithm.

Figure 6:
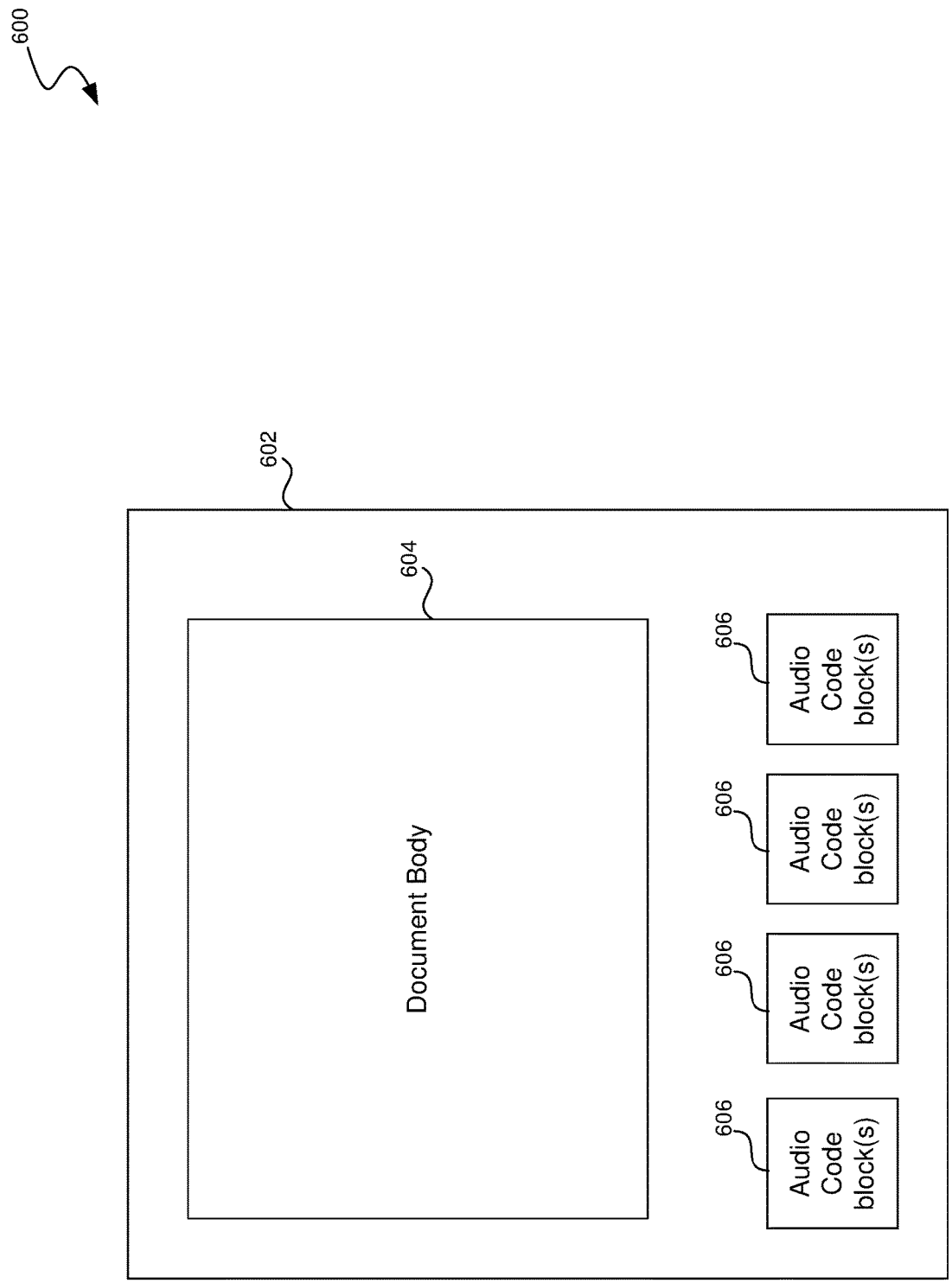
FIG. 6 is a conceptual diagram of a document with embedded user voice signature used in some implementations.

In some implementations, the generated voice signature can be embedded directly into the electronic document(s). FIG. 6 is a conceptual diagram of a document with embedded user voice signature used in some implementations. Diagram 600 includes electronic document 602, document body 604, and audio code block(s) 606. Document body 604 can include the content of the electronic document(s), such as agreement terms, contract terms, definitions, sections and sub-sections, and other suitable content. Audio code block(s) 606 can be blocks that represent that voice signature, such a series of QR codes that encode the voice signature as data. Any other suitable codes or code blocks can be used to embed the voice signature into the electronic document(s). In some implementations, the data encoded by audio code block(s) 606 can be used to reconstruct an audio file (or a representation of the audio file) that comprises the voice signature.

Implementations store the voice signature combined with the electronic document(s) to satisfy an audit of these elements at a later point in time. For example, if the user is questioning the agreement, the user can access the voice signature and listen to the user's voice accepting the agreement. In some implementations, the user's voice in the voice signature will also explicitly acknowledge certain sub-sections of the electronic document and/or a codeword associated with the user. Other suitable entities, such as the counterparty to the agreement or any other suitable third-party, can also access the voice signature and the electronic document(s) to satisfy any inquiries into the integrity of the agreement.

A "machine learning model," as used herein, refers to a construct that is trained using training data to make predictions or provide probabilities for new data items, whether or not the new data items were included in the training data, or an unsupervised machine learning model. For example, training data for supervised learning can include items with various parameters and an assigned classification/label. A new data item can have parameters that a model can use to assign a classification/label to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

Those skilled in the art will appreciate that the components illustrated in FIGS. 1-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
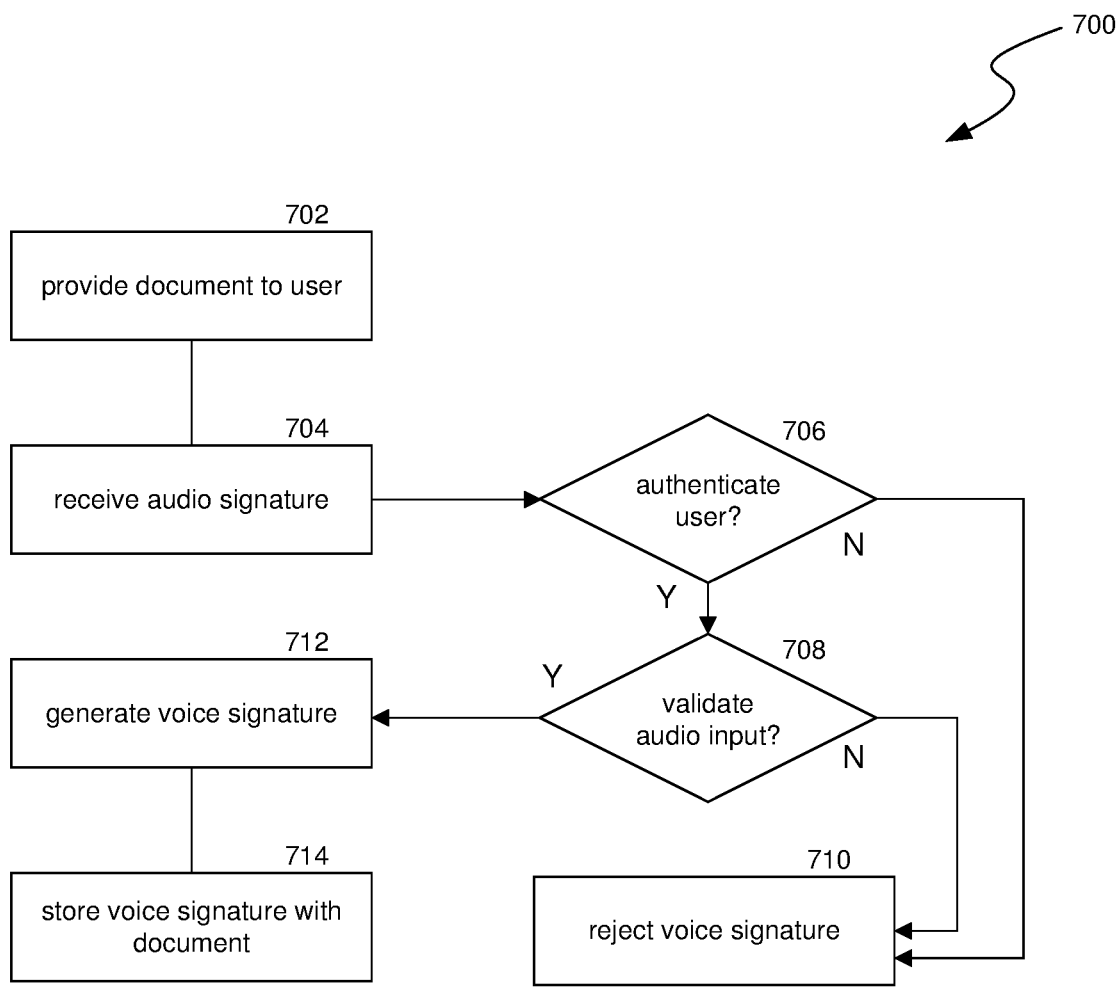
FIG. 7 is a flow diagram illustrating a process used in some implementations for generating a voice signature using validated input from an authenticated user.

FIG. 7 is a flow diagram illustrating a process 700 used in some implementations for generating a voice signature using validated input from an authenticated user. In some implementations, process 700 can be triggered as part of a flow to retrieve a user identity's signature for one or more electronic document(s). Process 700 can be performed at a cloud server or at any other suitable computing device.

At block 702, process 700 can provide electronic document(s) to a user. The electronic document(s) can be transmitted to the user's client device by any suitable document server (e.g., document generator), by a third-party contracting with the user, or by any other suitable entity. The electronic document(s) can be provided to the user at the client device via a user interface, such as via a webpage, secure online portal (e.g., secured with a username and password), email, or in any other suitable manner.

The electronic document(s) can include a contract or any other suitable documents that contain language for review by a user to enter into an agreement. In some embodiments, the electronic document(s) include one or more sub-sections, a document identifier (e.g., unique to the document(s)), a codeword, code phrase, or image associated with the user identity, or any other suitable component that aids in securing the user's voice signature for the document(s).

At block 704, process 700 can receive audio input from the user in association with the electronic document(s). In some implementations, the audio input is captured by one or more microphones at the client device that the user operates. An audio file can be generated at the client device and uploaded to a server configured to validate and/or authenticate the audio, for example through a secure portal.

In some embodiments, the electronic document(s) include one or more sub-sections, and the audio input includes sub-portions that represent the user's endorsement of the sub-sections. In another example, the electronic document(s) include a document identifier, and the audio input includes the user's voice speaking the identifier. In another example, the electronic document(s) include a codeword, code phrase, or image associated with the user, and the audio input includes the user's voice speaking the codeword or code phrase, or describing the image.

At block 706, process 700 can determine whether an identity for the user is authenticated. For example, voice reference sample(s) can be stored in relation to one or more identities (e.g., user identities managed at a system), and the signature manager can compare the audio within the audio input (e.g., the voice) to the voice reference sample(s). In some implementations, the electronic document(s) can be provided to a specific known user identity, and the audio input can be compared to voice reference sample(s) stored for the specific known user identity to authenticate that the audio within the input (e.g., the voice) is from the specific user identity. In some implementations, one or more machine learning models trained/configured to match reference voice(s) to input audio can be used to authenticate that the input audio is from the specific user identity.

In some implementations, the voice reference sample(s) stored for a particular user identity can be an embedding generated by a machine learning model. For example, the machine learning model can receive several pieces of audio from the particular user identity, process this data, and generate an embedding that represents the user identity's voice. The signature manager can then authenticate that a received piece of audio input includes audio from the particular user identity by providing a prediction model (e.g., machine learning model) the audio input and the embedding for the particular user identity. The prediction model can be configured to predict a likelihood that the received piece of audio input includes the voice of the particular user identity. When the prediction is above a threshold value, the signature manager can authenticate that the received piece of audio input includes audio from the particular user identity.

When the identity for the user is authenticated, process 700 can progress to block 708. When the identity for the user is not authenticated, process 700 can progress to block 710, where the voice signature is rejected. At block 710, the user can be displayed a message that indicates the voice signature was rejected. In some implementations, the message can display the reason for the rejection (e.g., authentication failure, failure of individual validation rules, etc.).

At block 708, process 700 can determine whether the audio input is validated. For example, the audio input can be validated against one or more validation rules. Example validation rules can validate that conditions for the audio input are suitable for the generation of a voice signature, such as quality rules, clarity rules, size rules (e.g., threshold audio file size), and other suitable validation rules.

In some implementations, one or more transcription models (e.g., machine learning model or other suitable transcription model) can be configured to extract natural language text from the audio input. In this example, at least one transcription model can be configured to output a confidence value for the transcribed text. The quality rules and/or clarity rules can comprise a criteria defined relative to the output confidence value. For example, when the transcription model can output a text transcript with a confidence above a threshold value, the quality and/or clarity of the audio input can be validated. In some implementations, a separate machine learning model can be configured/trained to assess the quality of the audio input and/or a separate machine learning model can be configured/trained to assess the clarity of the user's voice in the audio input.

Implementations can compare the transcriptions of the input audio to one or more validation rules. For example, one or more validation rules can be defined according to the provided electronic document(s). The provided electronic document(s) can include one or more identifiers (e.g., unique code numbers), and a validation rule can be defined that validates the audio input includes the user identity's voice speaking the one or more identifiers. In another example, a provided electronic document can include predetermined sub-sections, and a validation rule can be defined that validates the audio input includes the user identity's voice acknowledging or reading the predetermined sub-sections of the document.

In some implementations, one or more validation rules can be defined according to the user identity. For example, the user identity can be associated with a predetermined a codeword, code phrase, and/or image associated with the user, and at least one validation rule can be defined to validate that the audio input includes the user identity's voice speaking the codeword, code phrase, and/or descriptions of the image. When the audio input is validated, process 700 can progress to block 712. When the audio input is not validated, process 700 can progress to block 710, where the voice signature is rejected.

At block 712, process 700 can generate a voice signature for the user using the audio input. In some implementations, the voice signature represents the user's endorsement of the provided electronic document(s). For example, the generated voice signature can be an audio file (e.g., mpeg, mp3, etc.), compressed file, or any other suitable voice signature. In some implementations, the voice signature can be an audio file uploaded by the user (after the audio from the file is authenticated and validated).

At block 714, process 700 can store the electronic document(s) in combination with the generated voice signature. For example, the voice signature can be stored as an audio file and the electronic document(s) can be stored as data file(s), and these stored items can be linked (e.g., a link in the electronic document(s) can point to the storage location of the audio file). In another example, the voice signature can be compressed and embedded into the electronic document(s). For example, the voice signature can be embedded as a series of QR codes that represent the audio data. In another example, the electronic document(s) and voice signature can be added to a compression archive that is stored. In some implementations, these example storage items can be stored at a cloud storage device.

In some embodiments, the generated voice signature is stored using a blockchain ledger. For example, the electronic document(s) and voice signature can be included as a block in the blockchain ledger. In this example, multiple parties can manage the blockchain ledger, and thus the authenticity of the data stored at the blockchain ledger can be maintained. In some implementations, a block of the blockchain ledger can include portions of the voice signature and/or the electronic document(s).

In some embodiments, the stored electronic document(s) and voice signature are configured to satisfy an authenticity audit of the electronic document(s). For example, where the electronic document(s) represent an agreement between two parties, one or more of the parties (or a third-party) may seek an audit of the agreement. The stored electronic document(s) and voice signature can be accessed to satisfy the audit. For example, the user's voice signature can be played to demonstrate to the user that the agreement was endorsed by the user.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for generating a voice signature using validated input from an authenticated user, the method comprising:
providing an electronic document to a user;
receiving audio input from the user in association with the electronic document, wherein the audio input is captured by one or more microphones at a client device;
authenticating, using the audio input, an identity for the user by:
processing the audio input using one or more first trained machine learning models to generate an audio embedding; and
comparing, via a prediction model, the generated audio embedding to one of more pieces of audio references stored in association with the identity of the user, wherein the identity of the user is associated with first code data and the electronic document is associated with second code data;
validating the audio input against one or more validation rules by processing the audio input using one or more second trained machine learning models to extract natural language data from the audio input, wherein a first of the validation rules validates that the extracted natural language data from the audio input corresponds to the first code data and a second of the validation rules validates that the extracted natural language data from the audio input corresponds to the second code data;
generating, after the user is authenticated and the audio input is validated, a voice signature for the user using the audio input, wherein the voice signature represents the user's endorsement of the provided electronic document;
embedding, based on the user authentication and audio input validation, the electronic document with the first code data and/or the second code data; and
storing the electronic document in combination with the generated voice signature.

2. The method of claim 1, wherein the stored electronic document and voice signature are configured to satisfy an authenticity audit of the electronic document.

3. The method of claim 1, wherein the electronic document comprises one or more sub-sections, and the audio input comprises sub-portions that represent the user's endorsement of the sub-sections.

4. The method of claim 3, wherein at least one of the validation rules validates that the extracted natural language data from the audio input comprises user endorsements of each sub-section of the electronic document.

5. Method of claim 1,
wherein the first code data comprises a unique identifier and/or a codeword.

6. The method of claim 1, wherein the generated voice signature and the electronic document are stored using a blockchain ledger.

7. The method of claim 6, wherein the blockchain ledger is managed by the user and a counterparty to an agreement represented in the electronic document.

8. The method of claim 6, wherein the blockchain ledger comprises a transparent representation of a historic relationship between the identity of the user and the counterparty to the agreement represented in the electronic document.

9. The method of claim 8, wherein the blockchain ledger is configured to provide, in response to an audit request, the stored voice signature in association with the stored electronic document.

10. The method of claim 1, wherein the generated voice signature comprises audio data that is configured for audio playback via an audio player.

11. The method of claim 1, wherein the one or more first trained machine learning models comprise the prediction model.

12. The method of claim 11, wherein the one of more pieces of audio references stored in association with the identity of the user comprise one or more reference audio embeddings, and the prediction model is trained to: compare the generated audio embedding to the one or more reference audio embeddings, and predict a likelihood of a match.

13. A computing system for generating a voice signature using validated input from an authenticated user, the computing system comprising:
one or more processors; and
one or more memories storing instructions that, when executed by the one or more processors, cause the computing system to perform a process comprising:
providing an electronic document to a user;
receiving audio input from the user in association with the electronic document, wherein the audio input is captured by one or more microphones at a client device;
authenticating, using the audio input, an identity for the user by;
processing the audio input, using one or more first trained machine learning models to generate an audio embedding; and
comparing, via a prediction model, the generated audio embedding to one of more pieces of audio references stored in association with the identity of the user, wherein the identity of the user is associated with first code data and the electronic document is associated with second code data;
validating the audio input against one or more validation rules by processing the audio input using one or more second trained machine learning models to extract natural language data from the audio input, wherein a first of the validation rules validates that the extracted natural language data from the audio input corresponds to the first code data and a second of the validation rules validates that the extracted natural language data from the audio input corresponds to the second code data;
generating, after the user is authenticated and the audio input is validated, a voice signature for the user using the audio input, wherein the voice signature represents the user's endorsement of the provided electronic document;
embedding, based on the user authentication and audio input validation, the electronic document with the first code data and/or the second code data; and
storing the electronic document in combination with the generated voice signature.

14. The system of claim 13, wherein the stored electronic document and voice signature are configured to satisfy an authenticity audit of the electronic document.

15. The system of claim 13, wherein the electronic document comprises one or more sub-sections, and the audio input comprises sub-portions that represent the user's endorsement of the sub-sections.

16. The system of claim 15, wherein at least one of the validation rules validates that the extracted natural language data from the audio input comprises user endorsements of each sub-section of the electronic document.

17. The system of claim 13, wherein the first code data comprises a unique identifier and/or a codeword.

18. The system of claim 13, wherein the generated voice signature and the electronic document are stored using a blockchain ledger.

19. The system of claim 18, wherein the blockchain ledger is managed by the user and a counterparty to an agreement represented in the electronic document.

20. A non-transitory computer-readable storage medium storing instructions that, when executed by a computing system, cause the computing system to generate a voice signature using validated input from an authenticated user, the process comprising:
- providing an electronic document to a user;
- receiving audio input from the user in association with the electronic document, wherein the audio input is captured by one or more microphones at a client device;
- authenticating, using the audio input, an identity for the user by:
  - processing the audio input, using one or more first trained machine learning models to generate an audio embedding; and
  - comparing, via a prediction model, the generated audio embedding to one of more pieces of audio references stored in association with the identity of the user, wherein the identity of the user is associated with first code data and the electronic document is associated with second code data;
- validating the audio input against one or more validation rules by processing the audio input using one or more second trained machine learning models to extract natural language data from the audio input, wherein at a first of the validation rules validates that the extracted natural language data from the audio input corresponds to the first code data and a second of the validation rules validates that the extracted natural language data from the audio input corresponds to the second code data;
- generating, after the user is authenticated and the audio input is validated, a voice signature for the user using the audio input, wherein the voice signature represents the user's endorsement of the provided electronic document;
- embedding, based on the user authentication and audio input validation, the electronic document with the first code data and/or the second code data; and
- storing the electronic document in combination with the generated voice signature.

* * * * *